US007912234B1

(12) United States Patent
Graber

(10) Patent No.: US 7,912,234 B1
(45) Date of Patent: Mar. 22, 2011

(54) ACOUSTIC PROJECTOR FOR PROPAGATING A LOW DISPERSION SOUND FIELD

(76) Inventor: Curtis E. Graber, Woodburn, IN (US)

( * ) Notice: Subject to any disclaimer, the term of this patent is extended or adjusted under 35 U.S.C. 154(b) by 1389 days.

(21) Appl. No.: 11/058,328

(22) Filed: Feb. 15, 2005

(51) Int. Cl.

| | |
|---|---|
| ***H04R 25/00*** | (2006.01) |
| ***H04R 1/20*** | (2006.01) |
| ***H04R 27/04*** | (2006.01) |
| ***H04R 1/02*** | (2006.01) |
| ***H04B 3/00*** | (2006.01) |
| ***G10K 11/00*** | (2006.01) |

(52) U.S. Cl. ........ 381/160; 381/337; 381/352; 381/339; 381/75; 381/77; 381/387; 181/191; 181/175

(58) Field of Classification Search .................. 381/160, 381/337, 352, 339, 75, 77, 387; 181/191, 181/175
See application file for complete search history.

(56) References Cited

U.S. PATENT DOCUMENTS

| | | | | |
|---|---|---|---|---|
| 4,769,848 | A * | 9/1988 | Eberbach | 381/97 |
| 5,220,608 | A * | 6/1993 | Pfister | 381/17 |
| 5,821,470 | A | 10/1998 | Meyer et al. | |
| 6,031,920 | A * | 2/2000 | Wiener | 381/160 |
| 6,134,332 | A * | 10/2000 | Wiener | 381/160 |
| 6,441,798 | B1 * | 8/2002 | Ehrenberg et al. | 343/840 |
| 6,556,687 | B1 | 4/2003 | Manabe | |
| 6,625,288 | B1 * | 9/2003 | Koizumi | 381/160 |
| 2002/0071572 | A1 * | 6/2002 | Moertel | 381/82 |
| 2002/0126854 | A1 | 9/2002 | Norris et al. | |

OTHER PUBLICATIONS

American Technology Corporation, LRAD Long Range Acoustic Device, Publication Date 2003.

* cited by examiner

*Primary Examiner* — Vivian Chin
*Assistant Examiner* — Douglas J Suthers
(74) *Attorney, Agent, or Firm* — Paul W. O'Malley

(57) ABSTRACT

A broadband sound generator and transmitter provides minimal attenuation of sound over the distance between the generators and a point at a selected distance. The transmission component includes a parabolic dish and a positionable framework for the sound generators. The sound generators are positioned in front of the dish and oriented to direct sound into the dish for reflection toward a target. Drive signal conditioning circuitry apportion components of the drive signal to the several sound generators and adjust the signal in terms of delay and phase to accommodate changes in position of the generators relative to the dish.

16 Claims, 10 Drawing Sheets

Signal Conditioning Circuitry
Positioning Control
Shape Control
F
36
30
34
35
38
39
44
46
52
54
55
56
58

ACOUSTIC PROJECTOR FOR PROPAGATING A LOW DISPERSION SOUND FIELD

BACKGROUND OF THE INVENTION

1. Technical Field

The invention relates to directional loud speaker systems and more particularly to a acoustic source for delivering intense sound energy to a location spaced a substantial distance from the source.

2. Description of the Problem

A wide variety of acoustic transducers capable of absorbing substantial input energies to produce intense sound fields are available. Directional control of the sound produced and limiting the attenuation of sound field intensity may be effected using a number of types of enclosures and horns and careful positional arrangement of the transducers with respect to one another. The application of the sound system guides selection and blending of these techniques. Some systems, for example those intended for music, should minimize distortion. Many music amplification systems will limit themselves to use of an enclosure and a baffle around the transducers. A public address system tolerates some distortion, particularly at higher frequencies. This favors the use of a high degree of directional control to reduce the rate of drop off in sound pressure with increasing distance from the source. In a public address system it is common for the transducer to be horn loaded.

Of particular interest here is the possibility that a sound system can be adapted for use in the management of crowds or of individuals. It is well known that sound can be intensive enough to be disabling without threatening permanent injury. Were it possible to deliver a sound field of sufficient intensity to disable a person at a distance, or force his retreat, direct physical interaction between those charged with control of crowds, or limiting access to a facility, would be made easier. Such control would also appear far less dramatic and provocative to onlookers and those seeing recordings of the events on television.

Naturally it would of advantage to make such a system mobile. This factor dictates that the system be highly efficient and that sound generated by the system have a minimal drop off in intensity with distance. The directional control of the sound should also be high. The ability to optimize the sound field for the range to a target would also be of advantage.

SUMMARY OF THE INVENTION

The invention provides a broadband sound generator and transmitter. Sound generation is provided by a low frequency range transducer and a higher frequency range transducer array. The sound generators are located forward from a concave reflecting surface which has a forward radiant axis. The low frequency range transducer is located on the radiant axis and the higher frequency transducer array is located radially distributed about the forward radiant axis. The transducer and the transducer array are movable along the forward radiant axis to vary the focal point of sound radiated by the transducers into the concave reflecting source. A broadband input signal used to excite the transducers is applied to the transducers through signal conditioning circuitry connected between an input signal source and the transducers. The signal conditioning circuitry includes a cross-over module apportioning selected frequency components of the input signal between first and second channels, and phase and differential delay components adjusting for the changes in spacing between the transducers and the concave reflective surface.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
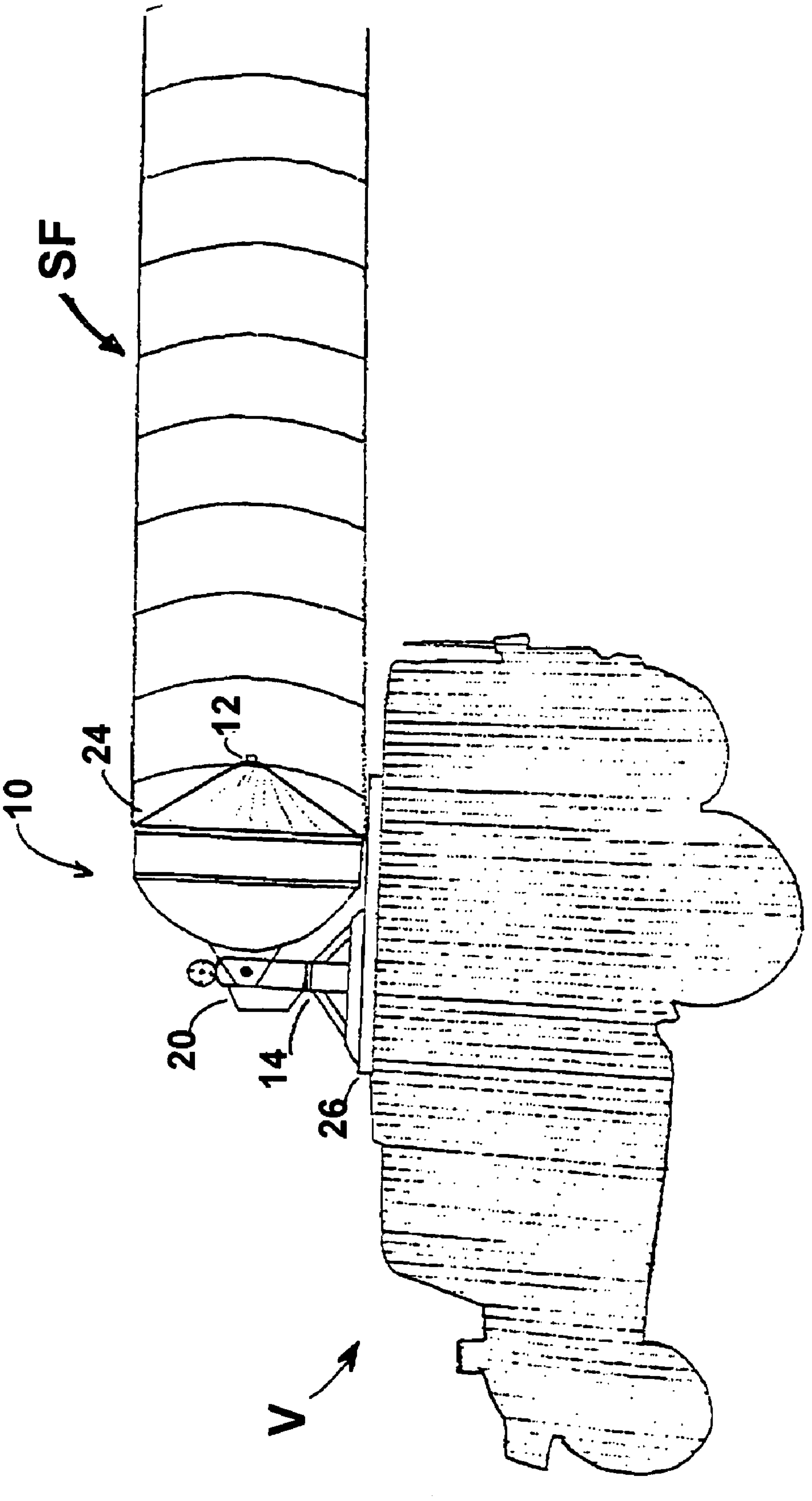
FIG. 1 is a side elevation of a broadband sound projector as taught by the present invention suitable for transport on a vehicle.
Figure 2:
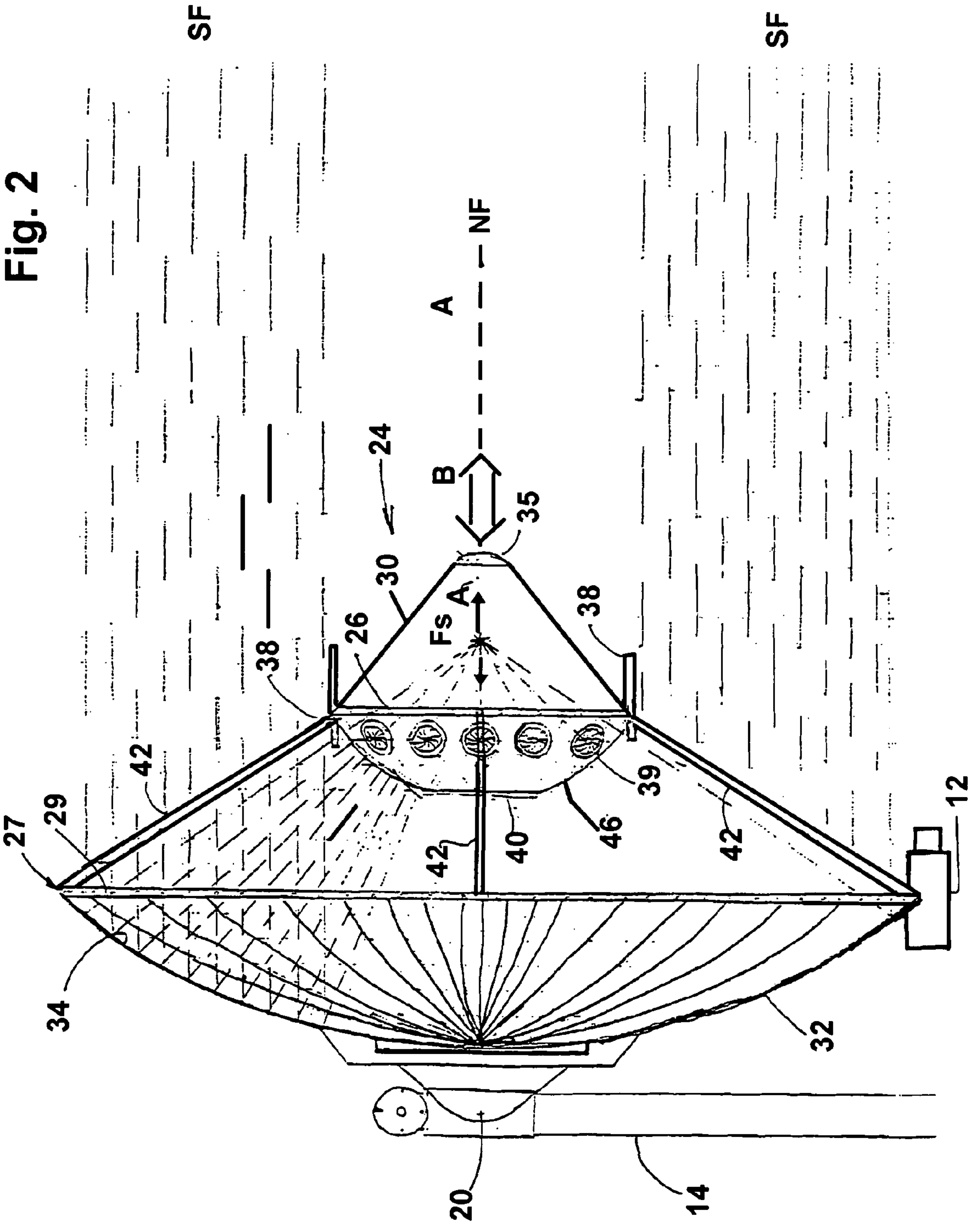
FIG. 2 is a partial cutaway view of the sound generating and transmitting apparatus of the preferred embodiment of the invention.

Referring now to the figures and in particular to FIG. 1 there is illustrated a mobile sound projection system 10 mounted on a Vehicle V. Sound projection system 10 includes a telescoping mast 14 supported on a base 26. Mounted at the upper end of mast 14 is a broadband sound projector 24. Broadband sound projector 24 is attached to mast 14 by an altazimuth mounting 20 allowing substantial freedom of positioning of the projector. Manual controls for mast 14 may be located within the Vehicle V. Broadband sound projector 24 supports a range finder and targeting camera 12 aligned with the radiant axis of the projector. FIG. 2 shows an alternative location for the range finder and targeting camera attached along the perimeter of parabolic reflector 32. Operator controls may include a television screen allowing identification of a target and controls for aiming a collimated sound field SF from the broadband sound projector 24.

Referring to FIG. 2, broadband sound projector 24 is illustrated in greater detail. Broadband sound projector 24 is based on a primary parabolic reflector dish 32 having a front concave reflecting surface 34 with a forward radiant axis A. Forward concave reflecting surface 34 preferably has a parabolic contour. Sound is reflected forward from concave reflecting surface 34 in a collimated sound field SF toward a far focus (shown in FIG. 3) substantially forward from the reflecting surface. Forward from the concave reflecting surface 34, lying along the forward radiant axis A of the concave reflecting dish 32, is a loudspeaker enclosure 30 which in turn includes a secondary parabolic dish 46 and a lens cap 35 defining an acoustic cavity 36 (shown in FIG. 4).

Sound field SF is fed by low frequency and high frequency acoustical transducers operatively positioned in a spaced relationship in front of the front concave reflecting surface 34 and centered on the forward radiant axis A. The acoustical transducers are mounted in the loudspeaker enclosure 30 and, more specifically, are mounted on a secondary parabolic dish 46 forming the end of enclosure 30 located closer to primary parabolic dish 32. Low frequency sound is generated by a loudspeaker 40 which is centered on the forward acoustical axis A and oriented to direct sound from its forward side directly into concave reflecting surface 34. The low frequency sound source is illustrated as a single driver; diaphragm unit, however other elements might be used. For example, the device could have multiple drivers. Higher frequency sound has as a source a plurality of horn loaded tweeters 39 which are disposed on the secondary parabolic dish 46 and oriented outwardly to direct sound toward the primary parabolic dish 32. Again, other high frequency sound services could be used, e.g. high frequency diaphragm elements. Tweeters 39 are arrayed radially around forward radiant axis A in a circle and the projection axis of the sound they generate is canted outwardly from the forward radiant axis A of the concave reflecting surface 34. Alternatively, the low frequency device could be a circular diaphragm disposed centered on the forward radiant axis with the HF sources located on or nearer to the forward radiant axis A. Whatever the arrangement, sound from both sets of transducers is reflected forward from concave reflecting surface 34 in a sound field SF collimated around null field NF. As described below, sound field SF slowly closes to a far focus $F_F$ which may be displaced from sound projector 24 by hundreds of meters.

Enclosure 30 provides both support for the transducers and a framework 27 for moving the transducers in and out along forward projection axis A relative to concave reflecting surface 34. By moving enclosure 30 the far focus $F_F$ of the forward reflected sound waves can be changed from tens of meters to hundreds of meters by changing the apparent acoustic source $F_S$ of the sound. Enclosure 30 is supported forward from concave reflecting dish 34 on framework 27 which is mounted to a rim 29 set on the perimeter of primary parabolic dish 32. The framework includes a plurality of struts 42 extending from the rim 29 forward from concave reflecting dish 34. Struts 42 converge on a perimeter ring 26 of smaller diameter than rim 27. Enclosure 30 rides on tracks 38 supported by the perimeter ring 26. Tracks 38 lie parallel to the forward radiant axis A. Linear motors (not shown) may be used to lock enclosure 30 in place on the tracks 38 and to move the enclosure to and fro along the forward radiant axis A as indicated by double arrow B. Movement of enclosure 30 changes the location of apparent source $F_S$ of sound directed into the concave reflecting dish and also changes the point of convergence of sound field SF forward from the concave reflecting surface 34. The object is to achieve beam collimation.

Conveniently mounted somewhere on the framework 27, such as depending from rim 29, is a range finder 12 which may include a television camera and laser range finder. Range finder 12 may also advantageously be mounted in lens cap 35 aligned with the forward radiant axis A of the concave reflecting surface 34. Acoustic projector 24 is movable as a unit up and down and in a circle using a motorized altazimuth mounting 20 set on the upper end of mast 14.

Figure 3:
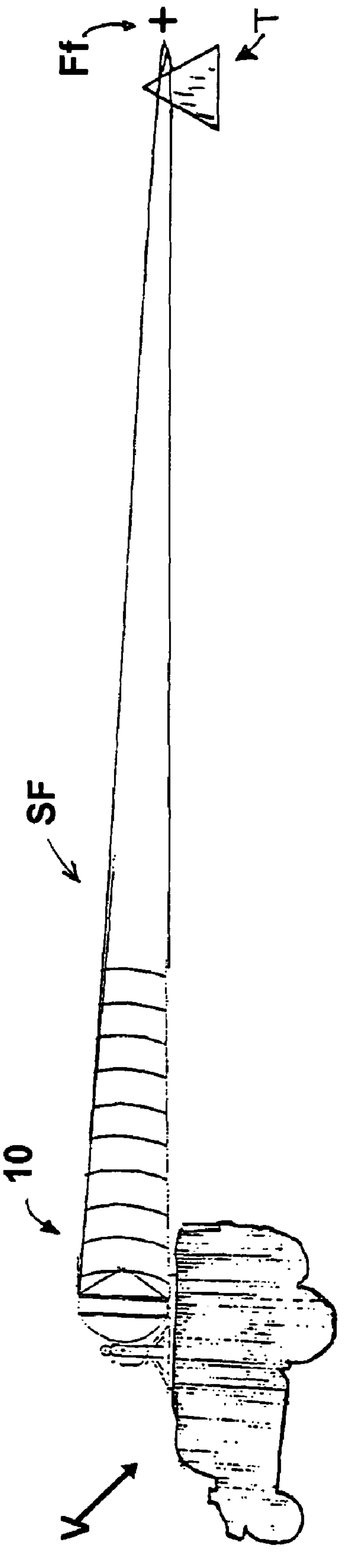
FIG. 3 is a diagram depicting convergence of the sound field generated by the apparatus of the invention on a target.

FIG. 3 illustrates convergence of a sound field SF projected from acoustic projector 24 on a target T located at a position displaced from acoustic projector 24. The point of convergence or far focus $F_F$ may be changed dynamically for a moving target.

Figures 4, 5:
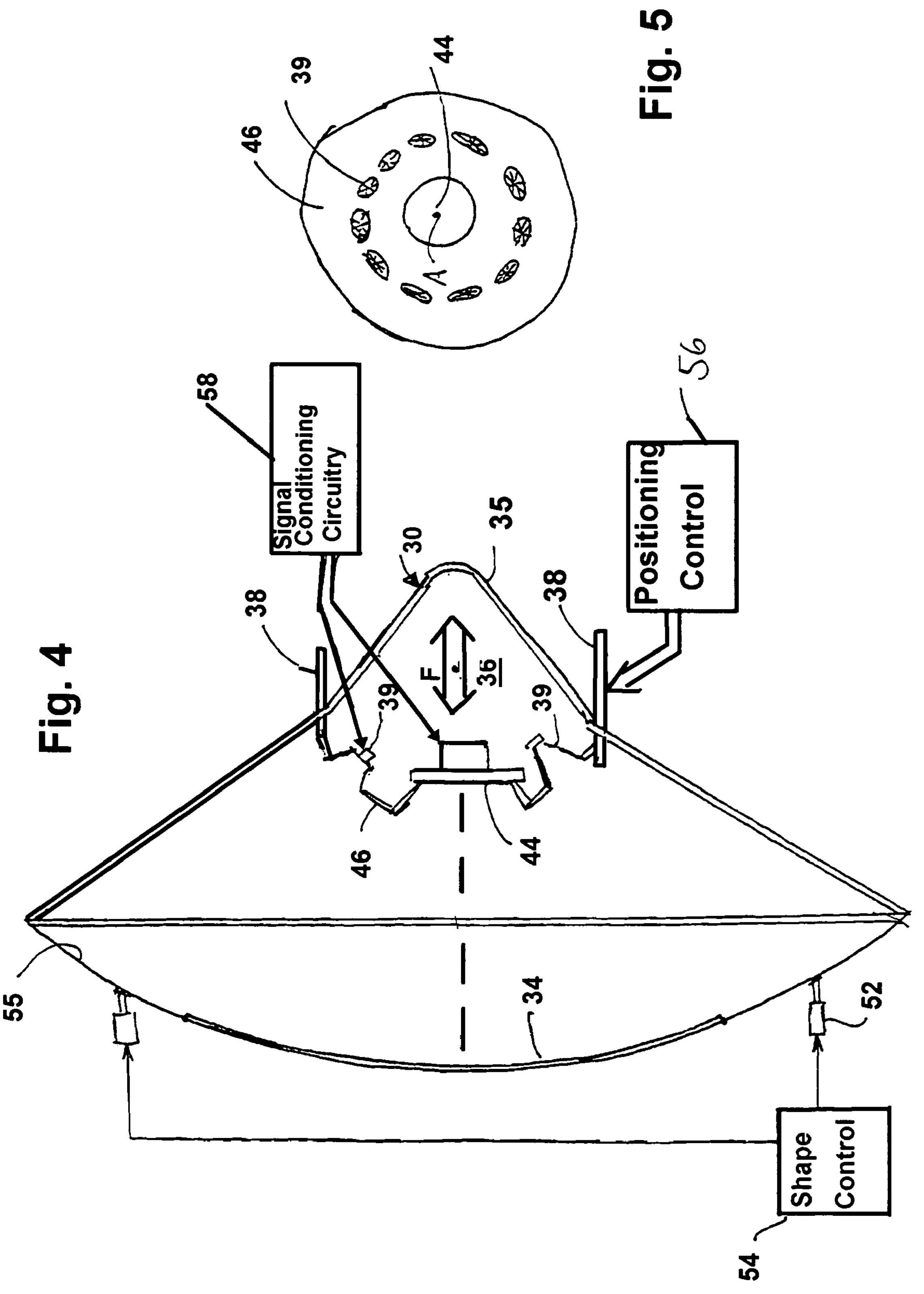
FIG. 4 is a cross sectional view of the sound generating and transmitting apparatus of a second embodiment of the invention.
FIG. 5 is a plan view of a secondary acoustic lens.

Referring to FIGS. 4 and 5, details of the mounting of loudspeaker 44 and horn loaded tweeters 39 on the secondary parabolic dish 46 may be seen. Bass or low frequency loudspeaker 44 is located centered in the secondary parabolic 46 and centered on forward radiant axis A of concave reflecting surface 34. Although only one loudspeaker is shown a plurality of devices could be used. The plurality of horn loaded tweeters 39 are disposed radially from loudspeaker 44, centered on forward radiant axis A, and canted outwardly from the radiant axis to direct sound toward the outer portion of the concave reflecting surface 34, or into an adjustable outer circumferential section 55 of the concave reflecting surface, as provided by a second embodiment of the projector and as shown in FIG. 4. The HF source need not be horn loaded tweeters and could instead be planar devices, a HF diaphragm, compression driven devices, etc.

Shape control of outer circumferential section 55 provides improved efficiency, i.e. reduced attenuation of the higher frequency sound generated by the array of horn loaded tweeters 39 and projected forward by the primary parabolic dish 32. Where primary parabolic dish 32 is divided into two sections 255, 55 the shape of the two sections can be better optimized relative to the predominant frequencies of the sound directed into the respective sections. Shape control of the outer circumferential section 55 is achieved by dividing the outer circumferential section into segments 155 which are independently positionable. (See FIG. 7). Movement of the segments 155 can be made dynamic and is done under the control of shape control circuitry 54 and pneumatic pistons 52. The input signal to the low frequency loudspeaker 44 and to the array of horn loaded tweeters 39 is processed by signal conditioning circuitry 58 as described below. Positioning control 56 of enclosure 30 is done responsive to target selection by a user.

Figure 6A:
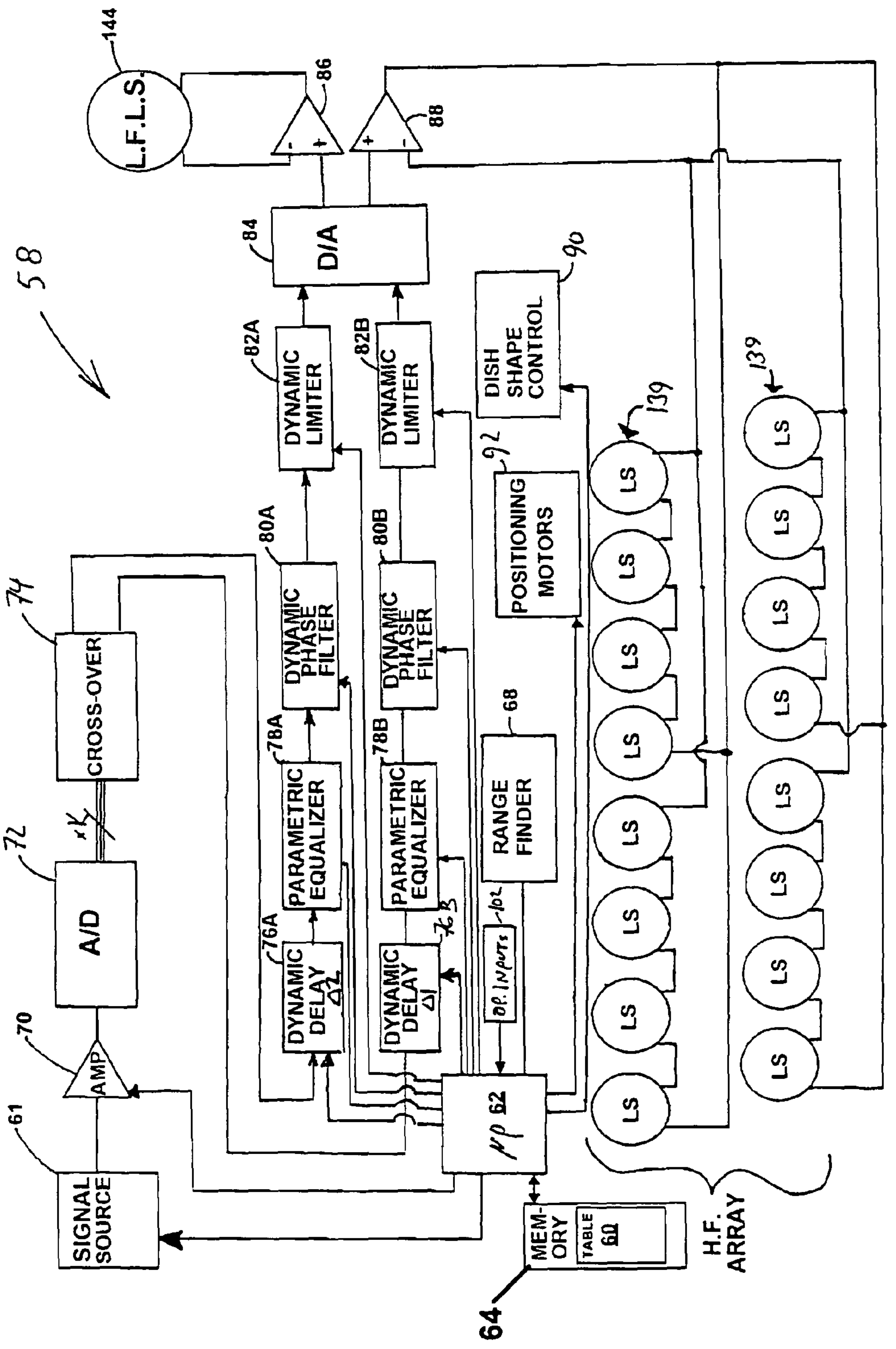
FIGS. 6A-B are block diagrams of signal conditioning circuitry for both the preferred and a second disclosed embodiment.
Figure 6B:
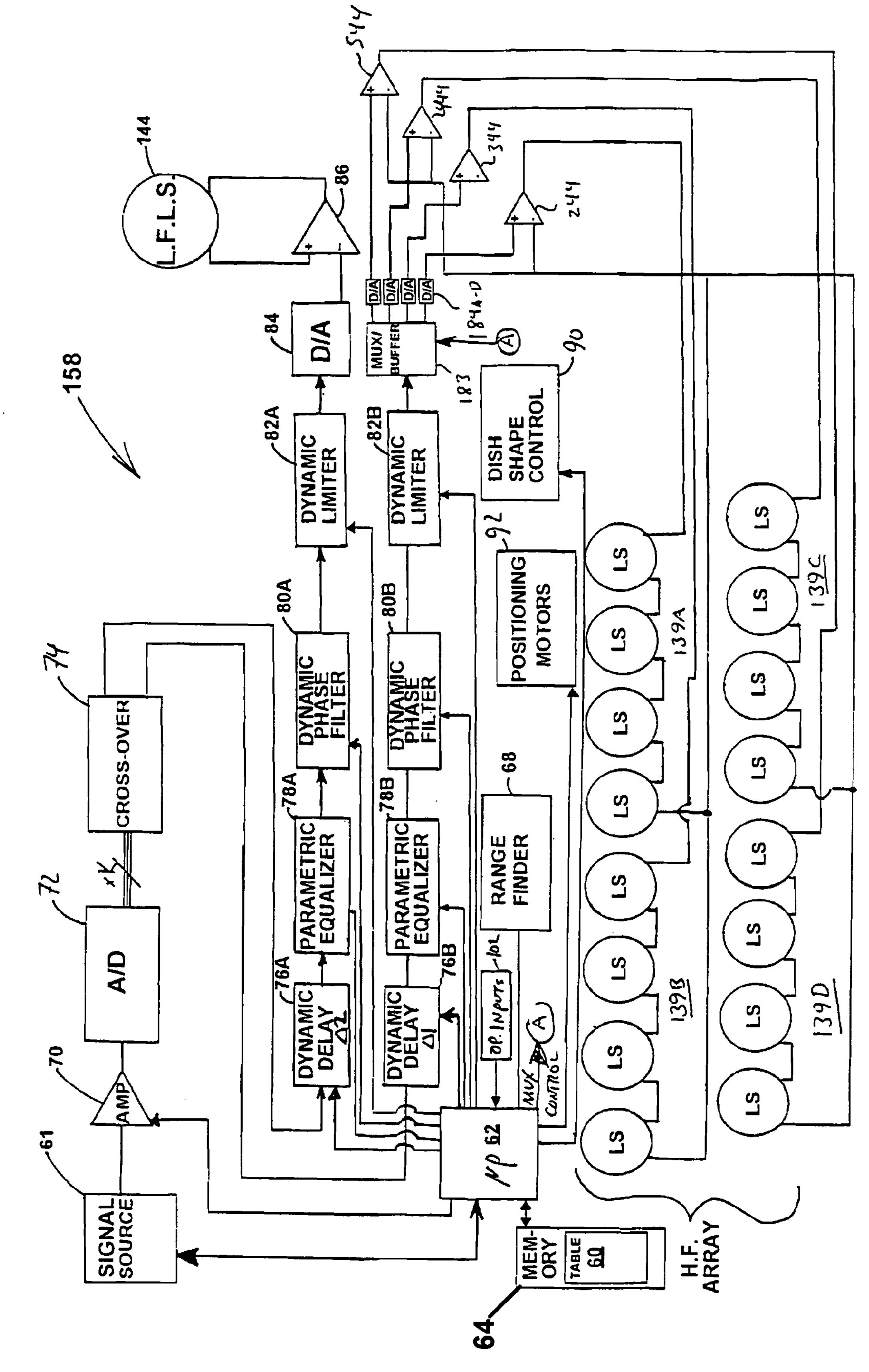

FIGS. 6A-B illustrate input signal conditioning circuitry 58, 158 in greater detail. Generation of a drive signal for the transducers 139 and 144 for the array of horn loaded tweeters 39 and the low frequency speaker 44 may be guided by one of several psychoacoustic objectives. Where the acoustic projector 24 of the invention is intended to alert individuals, a voice signal may be patched to conditioning circuitry. Where crowd control is desired one or more signal types are selected from a table of signals 60 stored in memory 64. These signals may include large first and third order distortions to produce highly unpleasant or uncomfortable sound which, when combined with high volume levels, is directed to driving people off. The signal conditioning circuitry 58 is intended to allocate components of the signal between the two sets of differing types of loudspeakers, adjust the signal as to delay to optimize reflective efficiency based on distance of the speakers from the concave reflective surface 34.

Generation of sound is initiated electronically upon microprocessor 62 receiving a trigger signal from operator inputs 102. Simultaneously with receipt of indication from an operator that sound is to be projected, the range to a target identified by the operator is obtained by microprocessor 62 from range finder 68. Range finder 68 may include a laser distance measuring element for this purpose. Or, a microphone may be built into the system for echo location. Aiming of the primary parabolic dish 32 is done under operator control by inputs from operator inputs 102 directed by microprocessor 62 as position control signals to positioning motors 92. Where the primary parabolic dish 32 is divided into inner and outer sections shape control of the outer circumferential section 55 is provided by dish shape control 90. This operation is informed by the frequency mix selected by microprocessor 62, delay of the signal and the distance to target and may be made dynamic.

Microprocessor 62 generates a signal for application to an audio signal source 61 (which may be an output port of the microprocessor). Audio signal source 61 generates a signal which is in turn applied to an adjustable amplifier 70. Microprocessor 62 controls the output amplitude to achieve an optimal typically non-lethal, sound pressure level at the target distance. The resulting signal is applied to an analog to digital converter 72 and the resulting digital signal is applied to a cross-over circuit 74 which passes selected frequency components to the signals to either of two channels. The channels, of course, correspond to the low and high frequency audio transducers. Each channel comprises four components, connected in series, and under the control of microprocessor 62. The components are connected, in series and include dynamic delay lines 76A-B, parametric equalization contour filters 78A-B, dynamic phase filters 80A-B and dynamic limiters 82A-B, in each channel. Operation of these components is under the control of microprocessor 62, which takes into the account the frequency and phase of the signals and the distance spacing the loudspeakers from the concave reflecting surface 34 to achieve near coherent summing of the signal mix to boost efficiency of the system. Before application of the signals to the respective sets of transducers, the signals are reconverted to analog signals by digital to analog converter 84. The outputs of converter 84 are amplified by amplifiers 86 and 88 and the respective amplified drive signals are applied to transducer 144, associated with low frequency loud speaker 44 and to audio transducers 139 associated with horn loaded tweeters 39.

It is not necessary that all loud speakers in an array be driven synchronously. Speaker drive channels can be divided so that groups of speakers, or individual speakers, are independently controlled. Circuitry to effect such operation can take a number of different forms. Similarly, digital signal processors can be programmed in a number of different ways to implement a given equivalent circuit. FIG. 6B is a possible implementation of a circuit to differentiate the signals applied to groups of speakers, but is by no means exhaustive of the possible forms such a circuit could take. The circuit of FIG. 6B is substantially identical to the circuit of FIG. 6A, except for the final stages of the high frequency channel. A multiplexor/buffer element 183 is connected to take the output of dynamic limiter 82B. A control signal from microprocessor 62 may be applied to multiplexor/buffer to direct signals received from dynamic limiter 82B among one of four channels. In effect, signal source 61 supplies four signals for four groups of H.F. loud speakers in a time division multiplexed format. Mux/buffer 183 operates to space divide the signals among 4 arrays of buffers, the output of which may be sequentially applied to D/A converters 184A-D for application to amplifiers 244, 344, 444 and 544, respectively. Amplifiers 244, 344, 444 and 544 supply loudspeaker arrays 139A-D with differentiated signals. Those skilled in the art will now realize that each speaker in the arrays would be individually driven by a separate amplification channel.

Figures 7A, 7B, 7C:
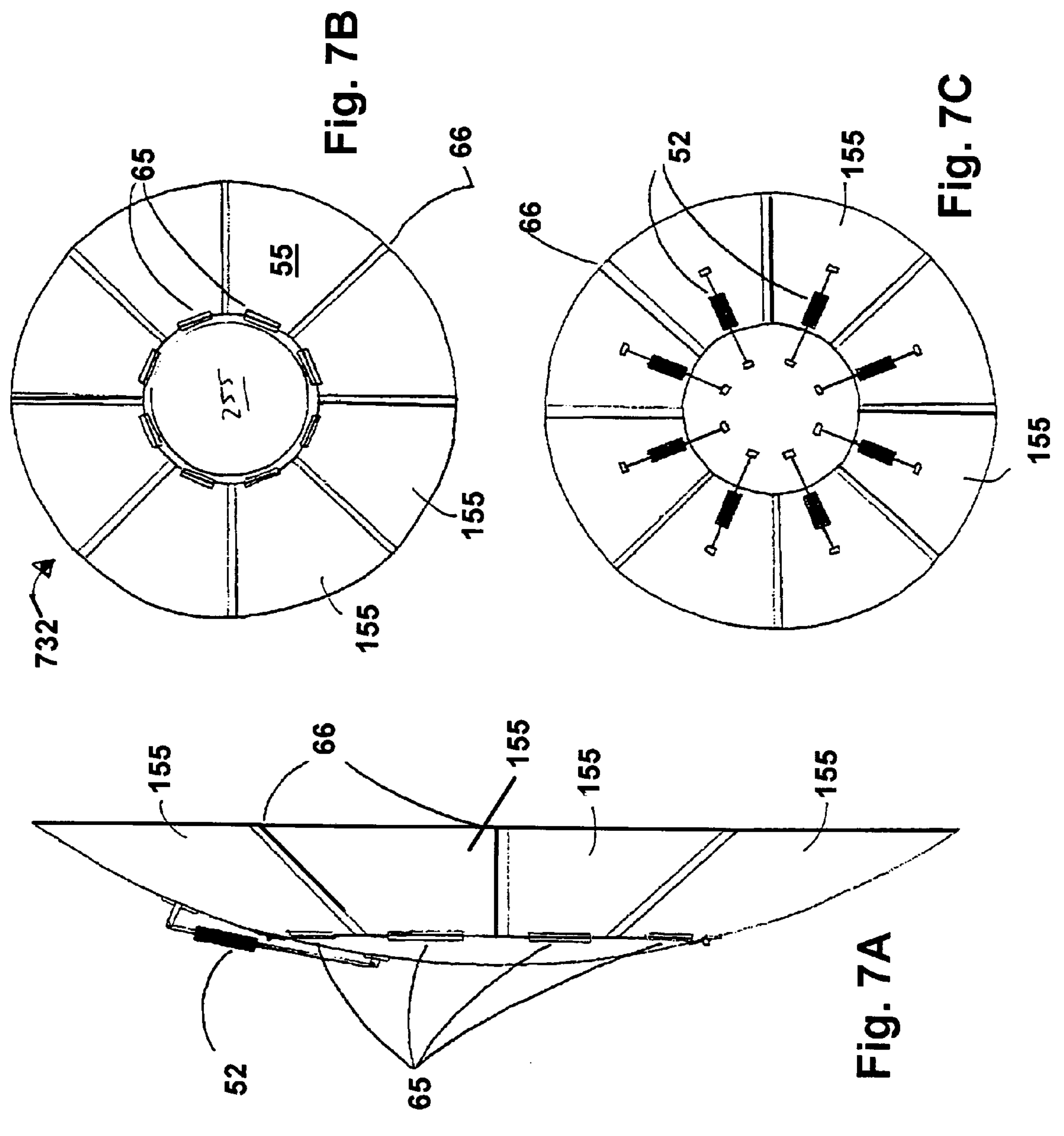
FIGS. 7A-C are side, front and back views of an alternative embodiment of the invention.

FIGS. 7A-C illustrate a two section primary parabolic reflector 732 in accordance with a second embodiment of the invention. An inner parabolic section 255 is centered on the focal axis A and provides a reflecting surface for low frequency sound radiation. Outer parabolic section 55 provides the primary reflecting surface for higher frequency acoustic radiation and is adjustable. A plurality of panels 155 extend radially from inner parabolic section 255, to which the outer section panels 155 are connected by hinges 65. Outer section panels 155 swing on hinges 65 between more open positions and more closed positions by use of positioning pneumatic pistons 52, with at least one being connected between each outer section panel 155 and the inner parabolic section 255. Individual outer section panels 155 are separated by ribs 66 which extend outwardly from inner parabolic section 255.

Figure 8:
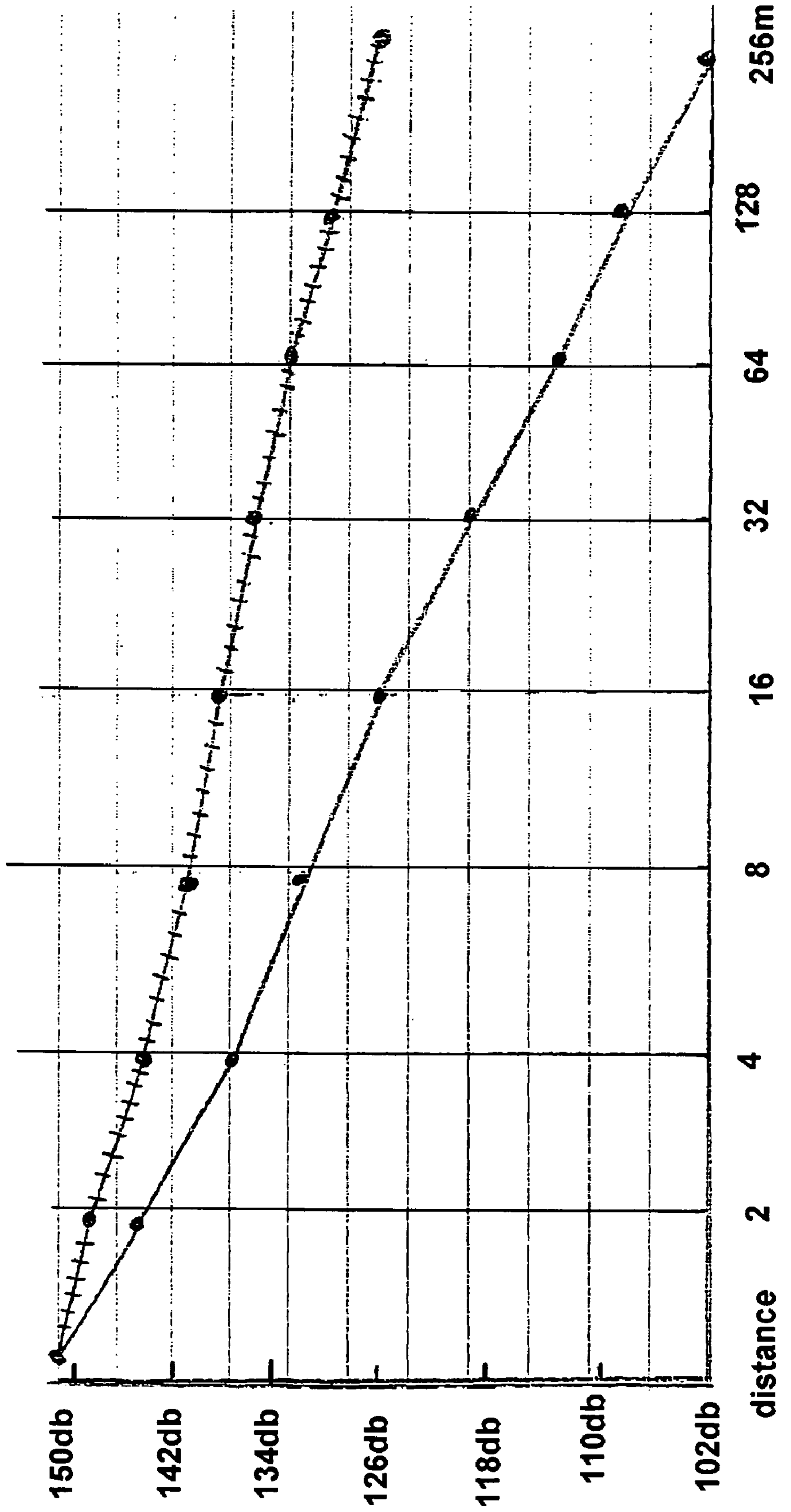
FIG. 8 is a graphical depiction of the sound attenuation produced by the projector of the present invention versus conventional attenuation.

FIG. 8 illustrates the reduction in attenuation of sound intensity at distance where attenuation is reduced from 6 DB per doubling of distance to 3 DB per doubling of distance. With an initial intensity of 150 DB sound intensity is still 126 DB at 256 meters instead of 102 DB as would occur with a point source in free space. At the higher intensity levels possible with the invention it is energy efficient to deliver uncomfortable sound to a precise location without use of deadly force and without the need for contact between crowd control personnel and people which are to kept at a distance.

Figure 9:
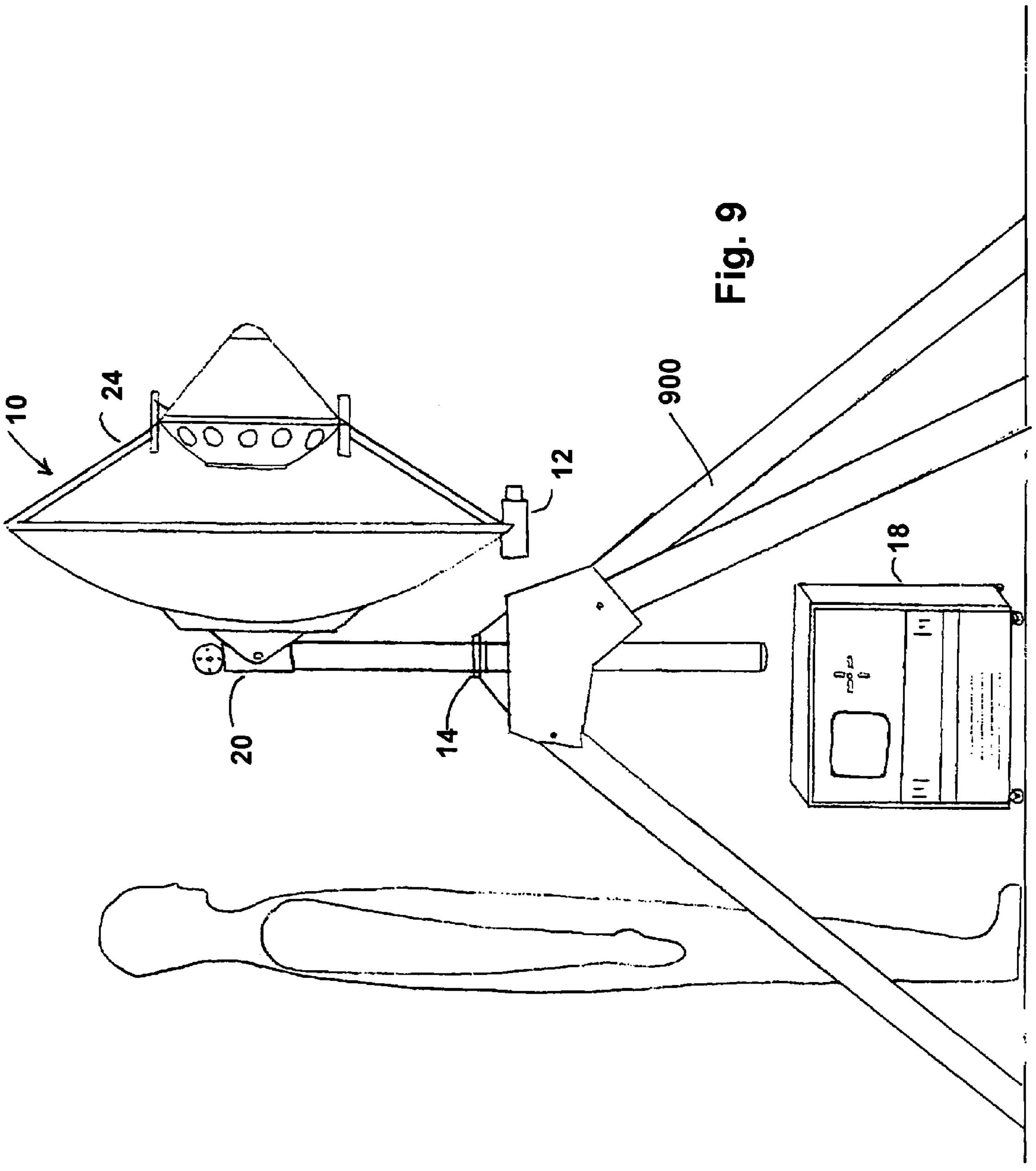
FIG. 9 is a side elevation illustrating an alternative support for a sound projector constructed in accordance with the invention.

Sound projection system 10 may be dismounted from a vehicle and set up as a stand alone unit powered by a local generator or battery (not shown). As illustrated in FIG. 9, sound projection system 10 has been mounted by mast 14 on a tripod 900. A control panel 18 is located nearby for use in aiming the system.

Figure 10:
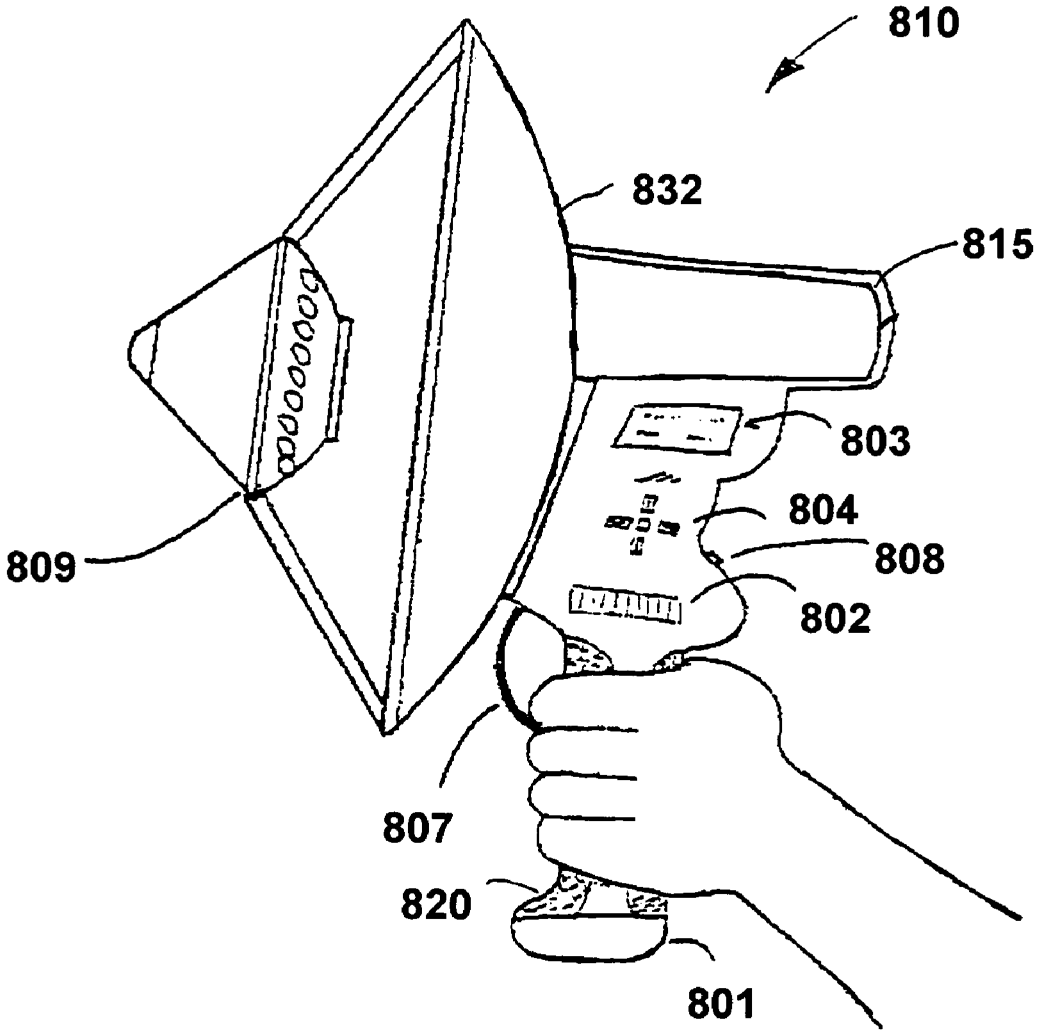
FIG. 10 is a side view of yet another packaging arrangement for a minaturized version of an embodiment of the invention.

FIG. 10 illustrates a hand held unit sound projector unit 810. The primary parabolic dish 832 is attached at its base to a housing 815 which encloses the signal generating and conditioning circuitry. Transducer arrays 809 are disposed forward from the primary parabolic dish 832. Visible on the lower portion of housing 815 are a mode selection screen 803, a mode selection keypad 804, a battery charge indicator 802, and a microphone 808 for use when the system is used for public address functions. A handle 820 extends below housing 815 providing a grip for a user allowing easy use of an on/off trigger 807. A replaceable battery pack 801 attaches to the bottom of handle 820.

The present invention provides a sound system adapted for use in the management of crowds or of individuals. Intensive, highly directed sound may be directed toward an isolated human target and disable or drive away the target without threatening permanent injury. Such a sound field makes it possible to disable a person at a distance, or force his retreat, without direct physical interaction between those charged with control of crowds, or limiting access to a facility, would be made easier. Such control should appear far less dramatic and provocative to onlookers and those seeing recordings of the events on television.

While the invention is shown in only a few of its forms, it is not thus limited but is susceptible to various changes and modifications without departing from the spirit and scope of the invention.

What is claimed is:

1. A broadband sound generating and transmitting apparatus comprising:
 - a primary reflector dish having a front concave reflecting surface which defines a forward radiant axis;
 - a low frequency acoustical transducer located centered on the forward radiant axis and oriented to direct sound onto the front concave reflecting surface to reflect the sound forward about the forward radiant axis;
 - an array of a plurality of higher frequency acoustical transducers, the plurality of higher frequency acoustical transducers being arranged radially about and spaced from the forward radiant axis and oriented outwardly from an apparent common source on the forward radiant axis to direct sound onto the front concave reflecting surface for reflection forward around the forward radiant axis; and a positionable framework supporting the low frequency acoustical transducer and the array of a plurality of higher frequency transducers in front of the primary reflector and providing for joint translation of the low frequency acoustical transducer and the array of a plurality of higher frequency transducers along the forward projection axis;

an audio signal source for the low frequency acoustical transducer and the array of a plurality of higher frequency transducers responsive to the distance of the positionable framework from the primary reflector and frequency and phase of signals to be applied to the low frequency acoustical transducer and to the array of a plurality of higher frequency transducers to promote coherent summing of sound fields from the low frequency acoustical transducer and the plurality of higher frequency transducers.

2. A broadband sound generating and transmitting apparatus as set forth in claim 1, further comprising:

means for repositioning the framework forward and backward on the forward radiant axis.

3. A broadband sound generating and transmitting apparatus as set forth in claim 2, further comprising:

the front concave reflector surface having a parabolic contour.

4. A broadband sound generating and transmitting apparatus as set forth in claim 2, further comprising:

the front concave reflector surface having an inner fixed parabolic contour and an outer variable parabolic contour.

5. A broadband sound generating and transmitting apparatus as set forth in claim 1, the audio signal source further comprising:

a input signal processing circuit including;

an input signal source, first and second processing channels connected to the low frequency acoustic transducer and the array of higher frequency transducers, respectively, a cross over element for applying portions of the input signal to the respective processing channels, and each of the first and second processing channels having connected in series, a dynamic delay element, a parametric equalization contour filter, a dynamic phase filter and a dynamic limiter.

6. A broadband sound generating and transmitting apparatus as set forth in claim 1, further comprising:

the audio signal source including;

an input signal source providing at least first and second signals for low and high frequency channels, respectively, low and high frequency processing channels connected to drive the low frequency acoustic transducer and the higher frequency transducers, respectively, the low frequency processing channel having connected in series, a dynamic delay element, a parametric equalization contour filter, a dynamic phase filter and a dynamic limiter, and the high frequency processing channel having a plurality of sub-channels for driving differentiated groups of the high frequency transducers.

7. A broadband sound generating and transmitting apparatus as set forth in claim 5, further comprising:

a microprocessor connected to each of the dynamic delay elements for independently adjusting the delay thereof, to each of the parametric equalizer contour filters, to each of the dynamic phase filters and to each of the dynamic limiters responsive to the frequency blend generated by the input signal source and to the spacing between the framework and the front concave reflective surface.

8. A broadband sound generating and transmitting apparatus as set forth in claim 7, further comprising:

a memory programmed with a table of audio signal types; and the microprocessor being coupled to the input signal source and to the memory for selecting audio signal types for generation by the input signal source.

9. A broadband sound generating and transmitting apparatus as set forth in claim 8, further comprising:

a range finder for determined distance to from the front concave reflecting surface to geographical locations spaced from the front concave reflecting surface; and the microprocessor being coupled to the range finder and programmed for positioning the framework responsive to the determined distance.

10. A broadband sound generating and transmitting apparatus as set forth in claim 9, further comprising:

means for aiming the primary reflector dish.

11. A broadband sound generating and transmitting apparatus comprising:

a concave reflecting surface defining a forward radiant axis;

a first sound source located forward from the concave reflecting surface, centered on the radiant axis and oriented to direct sound onto the concave reflecting surface parallel to the forward radiant axis for reflection forward from the concave reflecting surface;

a second, distributed sound source located forward from the concave reflecting surface, centered on the radiant axis and oriented to direct sound onto the concave reflecting surface diverging outwardly from the forward radiant axis from an apparent common source, the second, distributed sound source being oriented to produce sound directed into the concave reflecting surface for collimated reflection forward from the concave reflecting surface;

a signal source of a varying broadband input signal for the first sound source and the second, distributed sound source;

means for adjusting the location of the first sound source and the second, distributed sound source along the forward radiant axis;

signal conditioning circuitry connected between the input signal source and the first sound source and the second, distributed sound source, the signal conditioning circuitry including cross-over means for apportioning selected frequency components of the input signal between first and second channels, respectively, connected to the first sound source and the second, distributed sound source;

dynamic delay lines in the first and second channels; and a microcontroller responsive to the frequency mix of the input signal and to the location of the first sound source and the second, distributed sound source along the forward radiant axis from the concave reflecting surface for differentially adjusting the dynamic delay lines in the first and second channels to promote coherent summing.

12. A broadband sound generating and transmitting apparatus as claimed in claim 11, further comprising:

dynamic phase filters in the first and second channels with the microcontroller being further responsive to the frequency mix of the input signal and the location of the first sound source and the second, distributed sound source along the forward radiant axis from the concave reflecting surface for differentially adjusting the dynamic phase filters.

13. A broadband sound generating and transmitting apparatus as claimed in claim 12, further comprising:

the second, distributed sound source including a array of horn loaded mid or high frequency tweeters.

14. A broadband sound generating and transmitting apparatus as claimed in claim 13, further comprising:

the microcontroller being connected to control the output of the input signal source, the microcontroller having access to a library of signal types for application of a selected signal type to the input signal source to control generation of the input signal.

15. A broadband sound generating and transmitting apparatus as claimed in claim 14, further comprising:

a range finder for determining a distance between the concave reflecting surface and a remote target; and the microcontroller being connected to the range finder for responding to the determined distance for adjusting the location of the first sound source and the second, distributed sound source along the radiant axis.

16. A broadband sound generating and transmitting apparatus as claimed in claim 15, further comprising:

means for aiming the concave reflecting surface.

* * * * *